(12) United States Patent
Barton et al.

(10) Patent No.: US 11,689,643 B2
(45) Date of Patent: **\*Jun. 27, 2023**

(54) JUST-IN-TIME AUTO-PROVISIONING SYSTEMS AND METHODS FOR INFORMATION EXCHANGE PLATFORM

(71) Applicant: OPEN TEXT GXS ULC, Halifax (CA)

(72) Inventors: Jeffrey Wayne Barton, Myersville, MD (US); Waqas Ahmed, Clarksburg, MD (US); Ricardo Ceppi, Vienna, VA (US)

(73) Assignee: OPEN TEXT GXS ULC, Halifax (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 17/679,962

(22) Filed: Feb. 24, 2022

(65) Prior Publication Data

US 2022/0182463 A1 Jun. 9, 2022

Related U.S. Application Data

(63) Continuation of application No. 17/013,174, filed on Sep. 4, 2020, now Pat. No. 11,290,569, which is a continuation of application No. 15/960,136, filed on Apr. 23, 2018, now Pat. No. 10,771,591.

(60) Provisional application No. 62/500,848, filed on May 3, 2017.

(51) Int. Cl.
*H04L 67/63* (2022.01)
*G06Q 10/0633* (2023.01)
*H04L 67/06* (2022.01)
*G06F 16/22* (2019.01)

(52) U.S. Cl.
CPC .............. *H04L 67/63* (2022.05); *G06F 16/22* (2019.01); *G06Q 10/0633* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 2002/0082972 A1\* | 6/2002 | Renwick | G06Q 40/04 705/37 |
| 2006/0021019 A1\* | 1/2006 | Hinton | H04L 63/0815 726/10 |
| 2014/0075501 A1\* | 3/2014 | Srinivasan | H04L 63/08 726/1 |

(Continued)

*Primary Examiner* — Tonia L Dollinger
*Assistant Examiner* — Jonathan A Sparks
(74) *Attorney, Agent, or Firm* — Sprinkle IP Law Group

(57) ABSTRACT

An information exchange platform receives a file from a client system and processes the file for delivery to a trading partner (TP) of the client system. The TP does not need to be a client of the information exchange platform. So long as the file has some identifying information such as an email address that uniquely identifies the TP within a custom solution for the client system, the information exchange platform can automatically and programmatically provision the TP. An auto-provisioning subsystem is operable to create and/or configure information needed to complete the processing of the file just in time, including creating a legal entity and a routing address for the TP. When completed, the file is processed into a deliverable, which is then provided for delivery to the TP just in time as the file is received from the client system.

20 Claims, 8 Drawing Sheets

(56) References Cited

U.S. PATENT DOCUMENTS

2014/0222712 A1\* 8/2014 Samaha ................ G06Q 10/00
  705/342
2014/0237353 A1\* 8/2014 Pirvu ................... G06F 40/151
  715/249

\* cited by examiner

JUST-IN-TIME AUTO-PROVISIONING SYSTEMS AND METHODS FOR INFORMATION EXCHANGE PLATFORM

CROSS-REFERENCE TO RELATED APPLICATION(S)

This application is a continuation of, and claims a benefit of priority under 35 U.S.C. § 120 from, U.S. patent application Ser. No. 17/013,174, filed Sep. 4, 2020, entitled "JUST-IN-TIME AUTO-PROVISIONING SYSTEMS AND METHODS FOR INFORMATION EXCHANGE PLATFORM," issued as U.S. Pat. No. 11,290,569, which is a continuation of U.S. patent application Ser. No. 15/960,136, filed Apr. 23, 2018, entitled "JUST-IN-TIME AUTO-PROVISIONING SYSTEMS AND METHODS FOR INFORMATION EXCHANGE PLATFORM," issued as U.S. Pat. No. 10,771,591, which claims a benefit of priority under 35 U.S.C. § 119(e) from U.S. Provisional Application No. 62/500,848, filed May 3, 2017, entitled "JUST-IN-TIME AUTO-PROVISIONING SYSTEMS AND METHODS FOR INFORMATION EXCHANGE PLATFORM," all of which are fully incorporated by reference herein for all purposes.

TECHNICAL FIELD

This disclosure relates generally to data processing in a network computing environment. More particularly, this disclosure relates to just-in-time auto-provisioning systems and methods for an information exchange platform, useful for enterprise-to-enterprise electronic data interchange.

BACKGROUND OF THE RELATED ART

Today, enterprises and entities alike recognize the tremendous cost savings by exchanging electronic documents such as purchase orders, invoices, etc. with their trading partners via an electronic communication method referred to as the Electronic Data Interchange (EDI). However, diverse trading partner capabilities and their disparate and complicated systems present technical, strategy, and/or operational challenges to those considering using EDI.

Provisioning can be representative of one such challenge. In general, provisioning refers to the act or process of supplying or providing something, or making something available. The term "provisioning" can be used in a variety of contexts in today's technological environment. For example, in the telecommunication industry, the concept of network provisioning may refer to mediating a customer's services with respect to telecommunication network elements. In enterprise computing, provisioning may refer to the enterprise-wide configuration, deployment, and management of multiple types of enterprise system resources for enterprise customers. Regardless of these technological contexts, provisioning can generally be thought of as a combination of complex tasks performed by technical and non-technical humans (e.g., account representatives, information technology (IT) professionals, etc.) using various tools in an enterprise computing environment to set up accounts for users such that the users can, based on their individual unique user identity, access data repositories or are granted authorization to utilize the enterprise's software and hardware resources such as systems, applications, and databases in a controlled manner that ensures the security of the enterprise's resources. From the perspective of a customer of the enterprise (e.g., an operator of an EDI platform), provisioning can be thought of as a form of customer service.

Since it is in the enterprise's best interest to protect its resources from unauthorized accesses, customers of the enterprise in general do not have access to the enterprise's resources until they are properly provisioned. Unfortunately, because of the complexity involved, provisioning for a new customer can be a long and tedious manual process. At times, the length of time it takes an enterprise to provision a new customer may lead to poor customer satisfaction. Further, customers of the enterprise in general have no control as to how, when, and/or for whom an enterprise's provisioning may be performed.

SUMMARY OF THE DISCLOSURE

An object of the invention is to overcome these challenges and remove obstacles in exchanging information electronically, over disparate networked computer systems. According to embodiments, this object can be achieved in an information exchange platform referred to as a Trading Grid or TG. The OpenText GXS Trading Grid® represents an example of such a Trading Grid or TG.

A Trading Grid operates in a network environment and has the necessary resources (e.g., hardware, software, personnel, etc.) to provide managed services that enable the real-time flow or exchange of information electronically in the network environment in a secure, fast, and reliable manner, between and among disparate entities (also referred to herein as operating units or OUs). Examples of operating units may include enterprises, corporations, companies, agencies, etc. An example of a network environment may include a distributed computer network, a cloud computing environment, or the Internet. Non-limiting examples of managed services may include translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc.

A Trading Grid operates to facilitate the real-time flow or exchange of information between disparate entities regardless of standards preferences, spoken languages, or geographic locations. A Trading Grid may be embodied on server machines that support the electronic communication method (e.g., EDI) used by various computers that are independently owned and operated by different entities. In some embodiments, supported data formats may include EDI, Extensible Markup Language (XML), RosettaNet, EDI-INT, flat file/proprietary format, etc. Supported network connectivity may include dial-up, frame relay, AS2, leased line, Internet, etc. Supported delivery methods may include store-and-forward mailbox, event-driven delivery, etc. Supported transport methods may include Hypertext Transfer Protocol (HTTP), File Transfer Protocol (FTP), and Simple Mail Transfer Protocol (SMTP), etc. Supported network security protocols may include Secure Socket Layer (SSL), Secure/Multipurpose Internet Mail Extensions (S/MIME), Internet Protocol Security (IPSEC), Virtual Private Network (VPN), Pretty Good Privacy (PGP) encryption protocol, etc.

In some embodiments, a just-in-time auto-provisioning method for a Trading Grid disclosed herein may include receiving a file from a client system of an information exchange platform. The receiving may be performed by a receive process executing on a server machine operating on the information exchange platform. The method may further include preparing, by a normalize process, a normalized payload from the file. The normalize process is operable to remove data heterogeneity from the file received from the client system using a normalization model specific to the client system.

A just-in-time (JIT) provisioning subsystem is then called, for instance, by an orchestration engine, with the normalized payload. The JIT provisioning subsystem is operable to process the normalized payload to obtain a unique reference that identifies a trading partner of the client system in the context of a custom solution that is specific to the client system. The JIT provisioning subsystem is further operable to determine whether the trading partner of the client system had already been provisioned in the information exchange platform. This may entail searching the unique reference in the custom solution specific to the client system using a lookup service executing on the server machine operating on the information exchange platform.

When the trading partner of the client system is not found in the information exchange platform, the JIT provisioning subsystem is operable to automatically and programmatically provision the trading partner of the client system. The automatic and programmatic provisioning performed by the JIT provisioning subsystem includes running a JIT auto-provisioning workflow during which many pieces of information are generated and/or configured for the trading partner of the client system, including creating a legal entity and a routing address for the trading partner of the client system, both of which are internal to the information exchange platform. In some embodiments, the lookup service is configured for locking up access to the JIT auto-provisioning workflow of the JIT provisioning subsystem when the JIT provisioning subsystem is in progress to provision the trading partner of the client system. This is so that multiple files sent to the information exchange platform for asynchronous processing and deliveries will not trigger multiple just-in-time auto-provisioning processes for the same entity. In some embodiments, the JIT provisioning subsystem may call a workflow engine to determine, from the workflow definitions, an appropriate JIT auto-provisioning workflow model for JIT auto-provisioning the trading partner of the client system.

In some embodiments, the JIT auto-provisioning workflow may include creating a data flow tuple for the processing of the file from the client system. Such a data flow tuple has a set of tuple attributes, including a sender address for the client system, the routing address for the trading partner of the client system, and a document type. The data flow tuple has globally unique attributes within the custom solution and is associated with an itinerary that describes a processing model for processing the document type.

The JIT provisioning subsystem returns a response that contains the many pieces of information needed for downstream processing, including workflow attributes, data flow tuples, and the legal entity and the receiver address for the trading partner of the client system. The orchestration engine utilize the response from the JIT provisioning subsystem to complete processing of the file from the client system and produce a deliverable which is then provided for delivery to the trading partner of the client system just in time as the file is received from the client system.

In some embodiments, the client system may be external to and operate independently of the information exchange platform. In some embodiments, the client system may be operated by an enterprise client of the information exchange platform. A trading partner of the client system may or may not also be an enterprise client of the information exchange platform. Embodiments disclosed herein can be particularly useful when a trading partner of a client of the information exchange platform is not already an enterprise client of the information exchange platform.

In one embodiment, a system may comprise at least one processor, at least one non-transitory computer-readable storage medium, and stored instructions translatable by the at least one processor to implement a just-in-time auto-provisioning solution substantially as described herein. Another embodiment comprises a computer program product having at least one non-transitory computer-readable storage medium storing instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
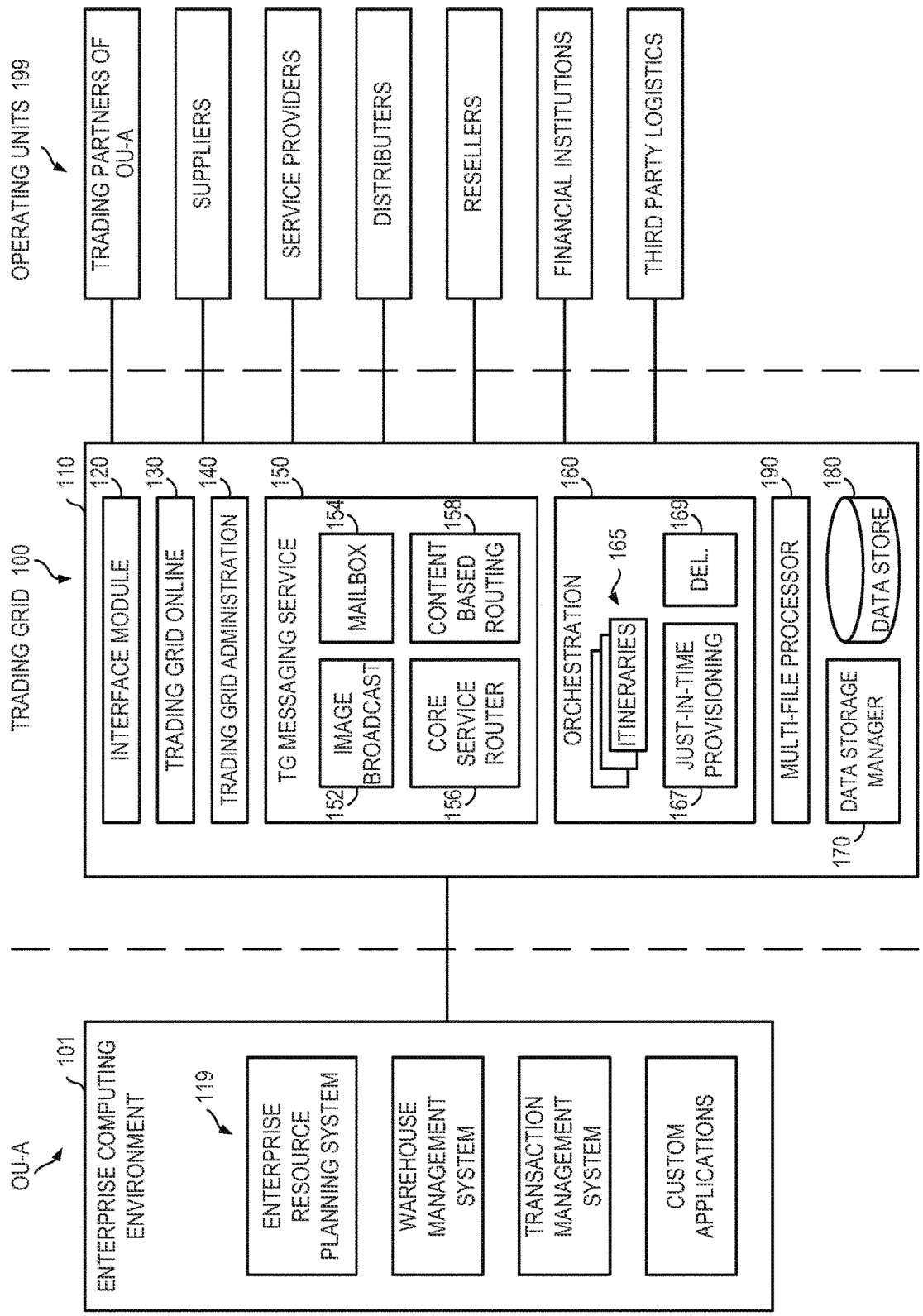
FIG. 1 depicts a diagrammatic representation of an information exchange platform operating in a computer network environment according to some embodiments.

FIG. 1 depicts a diagrammatic representation of an example information exchange platform, referred to as Trading Grid 100, operating in a computer network environment. Non-limiting examples of Trading Grid system architecture, implementations, and features can be found in U.S. Patent Application Publication Nos. US 2017/0124515 A1, US 2017/0053352 A1, and US 2017/0033987 A1, which are incorporated by reference herein.

In the example shown in FIG. 1, system 110 operating on Trading Grid 100 may comprise a plurality of modules, including interface module 120, Trading Grid Online (TGO) 130, Trading Grid Administration (TGA) 140, Trading Grid Messaging Service (TGMS) 150, Orchestration Engine 160, and Data Storage Manager (DSM) 170. In some embodiments, system 110 may be configured to provide and manage (orchestrate) a very large number (e.g., 50 or more) of services ("managed services"). Interface module 120 may be configured to provide user interfaces for registered operating units (OUs) such as OU-A with access to these managed services.

As an example, OU-A may own and operate enterprise computing environment 101 which is separate and independent of Trading Grid 100. From the perspective of Trading Grid 100 or system 110, OU-A represents a client of Trading Grid 100 (e.g., an enterprise customer) and systems 119 of OU-A which utilize managed services provided by system 110 are client systems of system 110. Client systems 119 operating in enterprise computing environment 101 may use managed services to communicate (e.g., exchange information) with various systems and/or devices operating in computing environments 199 that are owned and operated by various OUs such as trading partners (TPs) of OU-A.

Non-limiting examples of managed services provided by system 110 may include, but are not limited to, translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc. As a specific example, a document may be sent by OU-A from client system 119 (e.g., a custom application) to a computer belonging to a TP of OU-A utilizing Trading Grid 100.

A "document" in this context refers to the encoding of information in digital form for the purpose of exchanging the information with another party. The encoding of the document may also include meta-data about its content, destination, operational parameters, permissions, etc. Examples of documents in this context can include electronic data interchange (EDI)-encoded formats, all of the traditional office formats (Word, Excel, PowerPoint, etc.), computer-aided design and computer-aided manufacturing (CAD/CAM) files, multimedia content including video, and even content that could be provided by a device participating in an Internet of Things network. Skilled artisans appreciate that EDI is an electronic communication method that provides standards for exchanging data via any electronic means and that is defined as the computer-to-computer interchange of formatted messages by agreed message standards. EDI distinguishes mere electronic communication or data exchange in that in EDI, the usual processing of received messages is by computer only. By adhering to the same message standard, TPs, even if they are in two different countries, can electronically exchange documents (e.g., purchase orders, invoices, acknowledgement, notices, etc.).

In some embodiments, TGMS 150 may route the document sent by OU-A from client system 119 through various components for internal processing. For example, Content Based Routing (CBR) module 158 of TGMS 150 may route the document based on a relationship between OU-A (sender) and a TP of OU-A (receiver) and a document type (Doc Type) specified in itinerary 165.

In some embodiments, system 110 may track, via a trading partner graph, all the relationships for all OUs that utilize system 110 to electronically exchange information. The trading partner graph may be maintained and controlled by system 110 independently of an operating unit and/or its trading partner(s). The trading partner graph may be stored in a database (e.g., data store 180) and system 110 may access the trading partner graph by querying the database. Data associated with the operating unit and its trading partner(s) may also be stored in the database. Details and examples of a trading partner graph can be found in the above-referenced U.S. Patent Application Publication No. US 2017/0124515 A1, entitled "TRADING PARTNER RELATIONSHIP GRAPH FOR INFORMATION EXCHANGE PLATFORM."

In some embodiments, Orchestration Engine 160 may process the document based on itinerary 165. As an example, itinerary 165 may indicate that the document is to be processed by decompression, translation, formatting, and validation services. Delivery component 169 may deliver the document thus processed to the receiver (a TP of OU-A). In some embodiments, multiple itineraries 165 can be associated with the same pair of sender-receiver, depending upon the Doc Type associated with the document to be processed and delivered.

In some cases, not all OUs may be clients of system 110, although they may be communicatively connected to Trading Grid 100, as illustrated in FIG. 1. For example, system 110 may be configured for communicating with non-client OUs over SMTP. Skilled artisans appreciate that SMTP is an Internet standard for electronic mail (email) transmission. This allows system 110 to deliver a processed document to a non-client OU, for instance, as an attachment to an email. In some embodiments, in making a delivery, system 110 may create an email on behalf of one of its clients so that the email appears to have come directly from a partner of the non-client OU and the non-client OU is unaware of the processing performed on the document by system 110. In some embodiments, system 110 may deliver to a portal (which is an application of system 110) and an authorized user of the non-client OU can log in to the portal to retrieve the deliverable(s).

There are many ways to provision clients in system 110. Historically, these ramping (provisioning) processes are manually performed. For example, a representative of system 110 may reach out and engage with a customer, get certain information set from the customer (e.g., who they are, how to communicate with them, etc.), and use some internal tools that interact (e.g., via application programming interfaces (APIs)) with provisioning services to configure a workflow solution for the customer. This process can be labor-intensive, time-consuming, and inefficient.

To this end, the above-referenced U.S. Patent Application Publication No. US 2017/0033987 A1 provides a new way to provision managed services in which a service provisioning user interface (UI) may be dynamically generated for obtaining service-specific provisioning information from a user for generating a service-specific provisioning data instance that can then be deployed to a backend system. At runtime, the backend system utilizes the service-specific provisioning data instance to provide the provisioned service for a client system. In this way, a variety of services can be efficiently provisioned for a diverse set of clients in a scalable, streamlined, and cost-effective manner.

Such provisioning UIs and tools can be useful for large customers that may have a large number (e.g., 500 to 1000 or more) of TPs with technologically sophisticated systems including their own gateways, technology structures, internal processes, etc. It can be technically complex, procedurally challenging, and time-consuming for both a client of system 110 and system 110 to properly provision all the TPs of that client. When a TP is likely a repeat partner of the client, the client may be more willing to go through the many complex setups needed to set that TP up in system 110 in a standard, non-automated provisioning process. However, when a TP is likely an one-off partner or not a major trading community player, the client may be less inclined to go through the many complex setups, time, and resources needed to set that TP up in system 110 for what is probably a very rare delivery, for instance, over the SMTP.

In this context, it can be important for system 110 to provide an additional or alternative technical solution to the standard, non-automated provisioning process. This technical solution should be automated and allow a client's TP (e.g., a non-client of system 110) to be provisioned just in time of delivery, for instance, over the SMTP. This is because it is possible that, in many cases, a TP may not have any communication gateways or FTP server, but they probably do have an email provider and thus are reachable by emails. A goal here is to minimize or eliminate any disruption to the end users of OUs, while requiring very little time and information from a client when one endpoint (a client-sender) wishes to exchange information with another endpoint (a non-client-receiver) that may be heretofore unknown to system 110.

In some embodiments, this goal can be achieved in a new just-in-time (JIT) auto-provisioning solution particularly built for Trading Grid 100. As a non-limiting example, the JIT auto-provisioning solution disclosed herein is linked to a document data flow (e.g., a client of Trading Grid 100 sending a document to its TP). Skilled artisans appreciate that the JIT auto-provisioning solution disclosed herein can be implemented for other purposes based on the same or similar principles disclosed herein. Various complex JIT auto-provisioning services can be triggered depending upon needs and applications. For example, the JIT auto-provisioning solution disclosed herein can be implemented for custom solution setups.

In this disclosure, a custom solution (or a custom workflow solution) can be considered a grouping mechanism for identity uniqueness within a boundary or scope for a TP. System 110 provides a set of data flows within this boundary to address a problem space for that TP. Each custom solution can be identified through a solution identifier (ID) in system 110.

Figure 2:
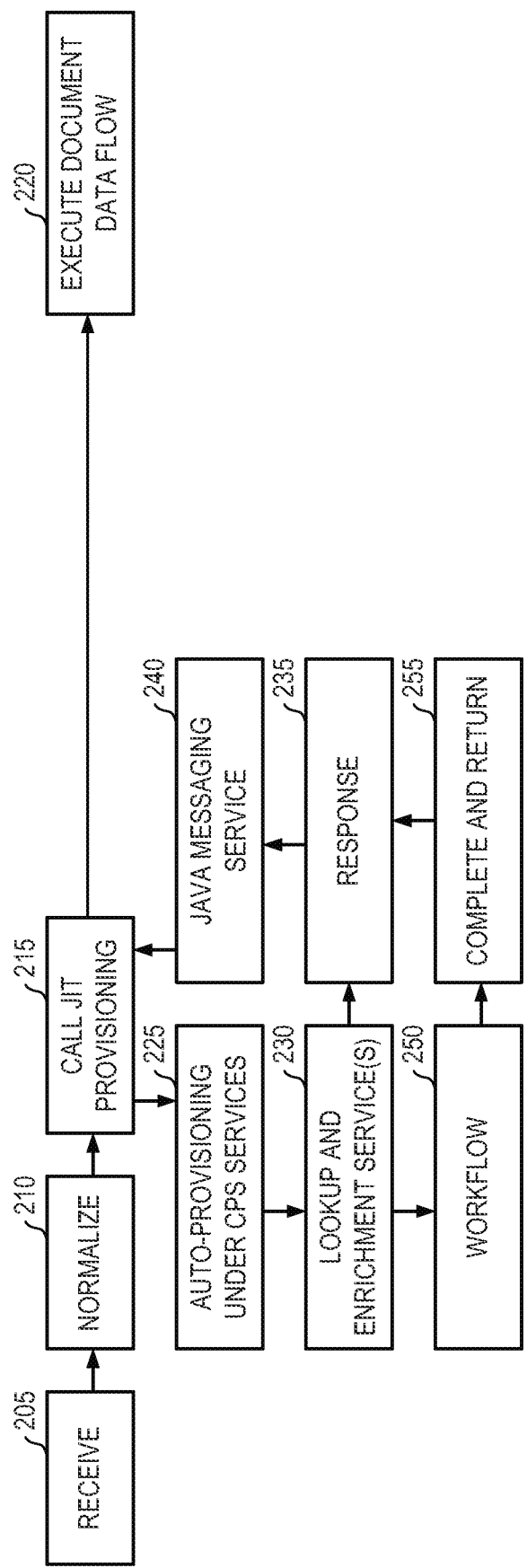
FIG. 2 depicts a flow diagram for an example of a just-in-time auto-provisioning operation according to some embodiments.

FIG. 2 depicts a flow diagram for an example of a just-in-time (JIT) auto-provisioning operation according to some embodiments. In this example, operation 200 begins at receive process 205 when a file is received by a Trading Grid (e.g., Trading Grid 100) from a backend system such as a Back Office System operating in an enterprise computing environment (e.g., enterprise computing environment 101) that is separate and independent from the Trading Grid. The Back Office System may be owned and operated by a client of the Trading Grid (that has a custom workflow solution already implemented in the Trading Grid) or a TP of the client (e.g., a participant in the client's trading community). In this context, a TP refers to an entity that participates in the client's trading community. "Community," in this context, refers to the logical relationships between the Trading Grid's client and all of its TPs. The logical relationships may be represented in a graph of TP connections referred to as a TP graph. The TP graph may be stored in a database (e.g., data store 180) as described above.

As a non-limiting example, the file received by a Trading Grid (e.g., Trading Grid 100) from a backend system may contain an invoice. Electronic invoicing (also called e-invoicing) is a form of electronic billing. E-invoicing methods are used by trading partners, such as enterprises and their suppliers, to present and monitor transactional documents between one another and ensure the terms of their trading agreements are being met. These documents can include invoices, purchase orders, debit notes, credit notes, payment terms and instructions, remittance slips, and so on.

An e-invoice can be defined as structured invoice data issued in EDI or XML formats, for instance, using Internet-based web forms. These documents can be exchanged in a number of ways including EDI, XML, or comma-separated values (CSV) files. They can be provided to the Trading Grid in many ways (e.g., via emails, web applications, FTP calls, API calls, etc.).

In some jurisdictions, such as Europe and South America, an electronic invoice may not be recognized unless it is a legal invoice. In this example, at the time the invoice was received by the Trading Grid, it was not yet a legal invoice. Since it can be important to meet e-invoicing standards in some jurisdictions, some embodiments can take advantage of e-invoicing services such as the Active Invoice and Compliance (AIC) service so that the invoice received by the Trading Grid from the backend system can be processed, signed by an appropriate certificate, and delivered as a legal invoice (e.g., a signed invoice in the Portable Document Format (PDF)).

There are many ways such electronic documents can be delivered. The list of current protocols is extensive. However, the fact that the Trading Grid actually initiates the delivery (referred to herein as the push delivery) is unique.

Push delivery refers to a delivery mechanism by which the Trading Grid has a TP's networking details set up in the delivery service provided by the Trading Grid. This is so that, when a file is received (e.g., from a client system of the Trading Grid for the client system's TP), the delivery service can understand that, for instance, a secure FTP connection is needed to deliver the file to this TP's FTP server and push a processed document (e.g., processed by the Trading Grid as, for instance, a legal invoice, a signed PDF, etc.) to the TP via the secure FTP connection.

Consider what is required in this push delivery scenario in the context of JIT auto-provisioning. A client of the Trading Grid may not have the networking details of their TPs. However, they may still want the Trading Grid to handle the file, generate a deliverable or deliverables (e.g., for multiple TPs) from the file, and push the deliverable(s) to their TPs (e.g., by email, portal, etc.).

For example, a client of the Trading Grid may not have their TP's server address, host address, and/or port information, or even know what that is. However, they may have a point of contact email address for each TP of theirs that is registered in their customer relationship management (CRM) systems.

In some embodiments, a point of contact email address is all the Trading Grid needs from a client to provision that client's TP so that the Trading Grid can process a file from the client (sender), attach the processed document (e.g., a signed invoice) to an email, and send it to an email destination of the client's TP (receiver). This delivery model requires very minimal information in terms of delivery.

As the nature of a delivery process is broaden out to more complex protocols, it becomes less and less likely that a Trading Grid client would have all the information about their TPs and be able to provide it to the Trading Grid as an initial input to the system. To this end, the JIP auto-provisioning solution disclosed herein can be expanded to include additional automation around testing, setting up, and/or connection validation. Accordingly, the JIP auto-provisioning solution disclosed herein is not limited to specific delivery models, for instance, emails over SMTP.

In some embodiments, a sender can send any file to the Trading Grid, so long as that file has some unique reference for its receiver. This unique reference can be anything that uniquely identifies a TP within the sender's specific custom solution defined in the Trading Grid. This can be the only constraint placed on a sender that sends a file to the Trading Grid for delivery to its trading partner(s).

Referring to FIG. 2, when the file was received by receive process 205, the receiver may not be known to the Trading Grid. That is, the receiver may not have been provisioned in the Trading Grid. For example, a client of the Trading Grid is trying to send an invoice to its TP through the Trading Grid. However, this TP is not a client of the Trading Grid and the Trading Grid has not made any deliveries to this TP before. Even so, the Trading Grid can process the file, derive the unique reference from the file, and try to identify the receiver with which the sender is trying to trade electronically. In this case, the client of the Trading Grid already has a workflow solution set up to process the file. However, since the client's TP does not actually exist in the Trading Grid at this moment in time, the client's workflow solution cannot be executed.

With the unique reference derived from the file, the Trading Grid can run a discovery process (e.g., has this TP been provisioned before or does this TP need to be JIT auto-provisioned) to look up information needed for a data flow defined in the client's workflow solution. As explained further below, the lookup step (evaluation) is the initial gating for whether or not the JIT auto-provisioning function is to be triggered. The JIT auto-provisioning function is operable to generate an internal routing address that can be used to create a tuple (sender-receive-Doc Type) for completing the data flow (within the client's workflow solution). This process can be transparent to the TP being provisioned.

In some embodiments, the Trading Grid can include a "from" address of the client, so the email appears to come directly from the client, although it actually comes from the Trading Grid. That is, the email to the client's TP is generated by the Trading Grid and the attachment is prepared by the Trading Grid, but the client's TP can be completely unaware of the work done by the Trading Grid or even the fact that the Trading Grid exists.

Skilled artisans appreciate that it is a very heterogeneous world when it comes to electronic documents. Disparate enterprises can have different data structures of their documents. Heterogeneity may exist even among documents that implement a standard data structure. For example, IDoc (short for Intermediate Document) is a standard SAP document format used by SAP- and non-SAP systems. An IDoc can have data segments, each data segment having various fields that represent data in a data record. Different clients of the Trading Grid may provide the needed information in different locations even if their files follow the standard IDoc data structure. For example, suppose delivery by email requires an email address. Different clients of the Trading Grid may indicate such an email address in different fields of their IDocs. To address this heterogeneity that maybe present in incoming files, normalize process 210 may process the file to remove heterogeneity and create normalized data (workflow payload) that can then be treated the same by managed services running in the system.

This process makes the data conform to the internal structure so that they can be worked on and processed through the Trading Grid. Normalization can be quite complex. Depend on the nature of JIT process (e.g., what each service needs), data can be normalized in different ways. Every one of these services may need some information. Normalization has to drive that information from what was received. For example, the AIC service which performs the legal signing may have certain information that it needs to construct a "legal profile" from the electronic document. To this end, normalize process 210 may leverage various normalization models. Each normalization model may have sections relative to the demands of a set of managed services, if they have one. In this way, no matter what the input is, the output of normalize process 210 can be the same. Depending on what the client is and what is to be JIT auto-provisioned, different normalization services may get invoked.

Previously, this is done by professional services responsible for direct enterprise customer interaction. To remove diversity, they reach out to the enterprise customers, go through the requirements with the enterprise customers, talk to them and find out where all their technological structures, processes, and data are in their internal systems, and communicate the results in a uniform way (e.g., same data format) to the engineers regardless of the inputs from the disparate enterprise customers. Engineers then build product development, including backend services (such as those in workflow solution 350 shown in FIG. 3), based on the requirements and inputs from the enterprise customers. In embodiments disclosed herein, these steps (and their associated complexities) are eliminated by normalize process 210 with customizable normalization models.

Accordingly, embodiments of JIT auto-provisioning disclosed herein allow a more direct and automated control of the provisioning process to Trading Grid clients themselves so long as they can conform to some achievable constraints, e.g., provide a unique identify for a TP to be JIT auto-provisioned, some email address for endpoint delivery, etc. In this way, a client of the Trading Grid can take control/ownership of JIT auto-provisioning of their trading partners that fall into the category where they will accept, for instance, signed invoices via emails.

In some embodiments, with a normalized payload from normalize process 210, operation 200 may proceed to call JIT provisioning service 215 (which can implement an embodiment of JIT provisioning module 167 of system 110 running on Trading Grid 100 of FIG. 1) to determine whether JIT auto-provisioning is needed to provision a receiver (a TP of the client of the Trading Grid) or is the receiver already set up (provisioned) in the Trading Grid. In some embodiments, this process may entail call JIT provisioning service 215 calling a sub process "Auto-Provisioning" 225 of Community Provisioning Services (CPS), for instance, via CPS interfaces. CPS may represent individual services, including encompass lookup and enrichment service(s) (referred to herein as lookup service 230), that are logically grouped together.

In some embodiments, lookup service 230 represents a gating function of whether JIT auto-provisioning is performed. In some embodiments, lookup service 230 may process normalized payload from normalize process 210, look or search in the normalized payload for a unique identifier for the receiver, and interact with a service to pass some details, essentially looking up whether the unique identifier already exists underneath the umbrella of a particular custom solution (e.g., a custom solution identified in the Trading Grid by a particular solution ID).

If lookup service 230 cannot find the unique identifier for the receiver in the custom solution associated with the sender, it can determine that the receiver has not been provisioned. In such a case, lookup service 230 is operable to invoke workflow 250 to automatically provision the receiver so that the file can be processed and delivered (e.g., via image broadcast 152) to the receiver just in time, without having to halt execution of document data flow 220 (which is defined per the custom solution associated with the sender, a process that is outside the scope of this disclosure).

In some cases, because the Trading Grid can perform workflows asynchronously, it is possible that a sender sends multiple electronic documents (e.g., invoices) for the same receiver one right after the other. In such situations, it can be desirable to avoid a race condition where multiple electronic documents for the same, previously unknown receiver were received and triggered multiple JIT auto-provisioning processes for the same, previously unknown receiver. To this end, in some embodiments, lookup service 230 can be implemented with a locking function such that lookup service 230 can avoid a race condition by locking access to JIT auto-provisioning workflow 250.

In some embodiments, when a file is received from a sender, lookup service 230 can parse out a unique identifier for a receiver (e.g., from a normalize payload of the file, as discussed above), and check to see if JIT auto-provisioning for the same receiver is in progress. That is, the first time through, lookup service 230 may operate to create a record and lock the record. In physical terms, this can be creating an entry or a row update in a database table to indicate that JIT auto-provisioning for the receiver is now "in progress." This is so that the next time when operation 200 is triggered (e.g., by the arrival of another invoice for the same TP) and lookup service 230 finds the same, previously unknown TP, the status is "in progress" which means the whole setup may not have been completed yet.

If so, lookup service 230 may release that file and try back in a while to see if that JIT auto-provisioning workflow 250 is complete. "Release" in this sense means that the file (which may represent another invoice for the same, previously unknown, but currently being provisioned receiver) is put back in a processing queue so that a previous file which triggered the initial JIT auto-provisioning for the receiver can be processed.

In some embodiments, receive process 205 and normalize process 210 can be queue-based. Skilled artisans appreciate that orchestrated services can be invoked over queues. Accordingly, queues are not represented in FIG. 2, although they are utilized in operation 200. For example, JMS 240 can represent a queuing system.

The lock-and-release mechanism described above can ensure that, when multiple files are received by the Trading Grid for the same previously unknown receiver, only a single JIT auto-provisioning process is invoked. Once the receiver is automatically provisioned, it does not need to be provisioned again and all future deliveries to the receiver can be made automatically.

If lookup service 230 finds that the receiver has already been provisioned, response 235 is generated and sent back (via, for instance, Java Messaging Service (JMS) 240) to the orchestration component (e.g., Orchestration Engine 160) to circumvent workflow 250. If lookup service 230 cannot find the receiver in the system and/or no JIT auto-provisioning process is in progress for the receiver, it puts a lock on that unique identifier for the receiver and invokes workflow 250.

Figure 3:
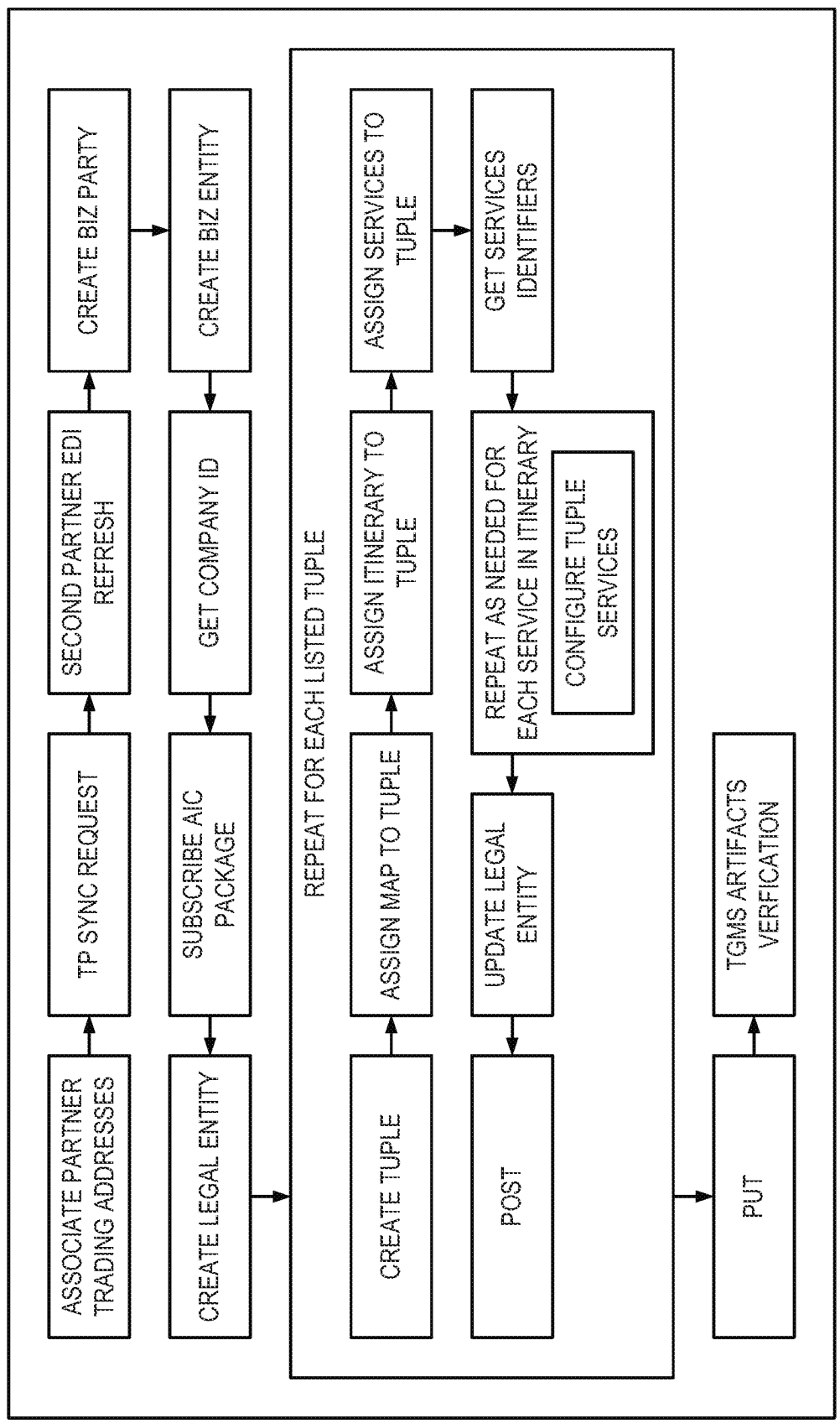
FIG. 3 depicts a diagrammatic representation of an example of a workflow for a custom solution according to some embodiments.

In some embodiments, workflow 250 can be specific to a custom solution in the Trading Grid, for instance, as set up in a specific custom solution for the sender. FIG. 3 depicts a diagrammatic representation of a non-limiting example of workflow 350 for a custom solution according to some embodiments. Skilled artisans appreciate that different clients of the Trading Grid may have completely different workflow requirements. That is, different custom solutions have different use cases and thus workflows for different custom solutions would be configured differently. Accordingly, workflow 350 shown in FIG. 3 is meant to be exemplary and non-limiting.

In the example of FIG. 3, workflow 350 represents an automated provisioning process with individual steps required one form or another in order to set up the entirety of all the services necessary to support a particular custom solution. For example, if the custom solution of a client-sender requires that an invoice be signed by the AIC service, workflow 350 may include invoking the AIC service. FIG. 3 shows that the individual steps in the entire process of workflow 350, which are performed automatically and programmatically, may relate to messaging service, addressing, routing, AIC (e.g., the subscribing AIC package step allows certain features to be accessible through TGO capabilities related to AIC), creating legal entities, creating a receiver address, creating a TP representation in the Trading Grid's community master data service so now a record of that TP exists in a Trading Grid client's TP graph, creating a legal entity with profile information (e.g., as needed by the AIC service), creating party information representing the profile information, etc. Such profile information may be needed for an SMTP delivery service so that it knows what to do when it gets a file from this TP (e.g., sending an email with an attachment to it). In some cases, multiple calls may be needed to make each step in workflow 350 happen.

As illustrated in the example of FIG. 3, the individual steps of workflow 350 are arranged in order due to data constraints—something has to exist before something else can be created. Once all of the steps of workflow 350 are completed, everything is set up for the TP so the Trading Grid client's document data flow (e.g., document data flow 220) can be completed all the way to eventually make a delivery to the TP. In a non-automated provisioning process, each step would be manually invoked using some kind of tools and UIs. For example, in the Trading Grid, a "legal entity" refers to an entity created within the Trading Grid.

Such legal entities are not standard or associated with e-invoicing. Rather, a legal entity refers to a data object created within the Trading Grid to hold certain attributes that are necessary for certain processing, for instance, the e-invoicing process associated with signing, e.g., a custom certificate. The signing process can be quite complicated as it is predicated on the point of origin of the invoice and the point of destination. However, it is necessary for the AIC logic to execute against a particular invoice. In a non-automated provisioning process, such legal entities are created manually in the Trading Grid by customer-facing professional services. Here, the automated provisioning process (as exemplified by workflow 350 of FIG. 3) is operable to programmatically and automatically generate and configure all the necessary information for a client's TP, including, among others, creating a legal entity and a receiver address (both of which are internal to the Trading Grid) for the client's TP (which the Trading Grid is encountering for the very first time), just in time to make a delivery to the client's TP.

As an example, to create a receiver address programmatically and automatically, workflow 350 may invoke an API to the Trading Grid messaging infrastructure (e.g., TGMS 150 shown in FIG. 1) to request a receiver address be programmatically and automatically created. In this disclosure, a receiver address refers to a non-EDI routing address needed by the Trading Grid internally to route and process a document in order to make a delivery (e.g., to an email server of a client's TP, to a portal accessibly by the client's TP, etc.). This non-EDI routing address provides a way (e.g., for a routing engine such as Core Service Router (CSR) 156) to uniquely identify a data flow of a Doc Type between a sender and a receiver. Each TP needs to have such an internal routing address so processed documents can flow to them through the Trading Grid. That is, call JIT provisioning service 215 is operable to provide a receiver address that is needed by the downstream activities to work properly. TPs and external systems are unaware of these programmatically and automatically created non-EDI routing addresses internal to the Trading Grid.

In some embodiments, a receiver address is associated with a TP's mailbox (e.g., mailbox 154 shown in FIG. 1). In some cases, such a mailbox can be an artifact in the messaging infrastructure and is not used in an operational way in the Trading Grid. It is created to associate an address and has no relevance in downstream activities (e.g., it's not used in document data flow 220, which is internal to the Trading Grid).

Referring to FIG. 2, workflow 250 completes the steps (see workflow 350 shown in FIG. 3) and returns (step 255) response 235 to call JIT provisioning service 215 via JMS 240. Call JIT provisioning service 215 is configured for handling a particular kind of response 235, whether it comes from lookup service 230 or from workflow 250. As discussed above, response 235 includes a receiver address for the newly provisioned TP to be used in all future processing in document data flow 220. Details of response 235 are further described below.

In the example of FIG. 2, operation 200 is triggered by the arrival of a file (e.g., an invoice). There is no human involved in operation 200 at all. Following the above example, the arrival of an invoice from a sender triggers operation 200 and the invoice was received by receive process 205. Receive process 205 may operate to determine an itinerary because the invoice comes from a particular client of the Trading Grid, to a particular email address, and has a particular Doc Type. This specific combination of Sender, Receiver, and Doc Type indicates to receive process 205 that it needs to execute an itinerary which includes normalize process 210 and call JIT provisioning service 215. Referring to FIG. 1, in some embodiments, Orchestration Engine 160 may control operation 200 automatically as triggered by the arrival of that invoice. Once operation 200 is done, document data flow 220 is free to execute the actual data flow.

In some embodiments, document data flow 220 may utilize a set of attributes generated by workflow 250 (e.g., in response 235). Examples of such output attributes from workflow 250 may include a receiver address (e.g., "Address"="XYZ") that belongs to a mailbox (e.g., "Mailbox"="ma12") and a Doc Type value (e.g., "Doc Type"="X") configured from this particular workflow perspective (because different Doc Types may be applicable for different workflows). Some attributes may be highly critical to downstream processes (e.g., receiver address, sender address, and Doc Type, which are core tuple attributes).

In some embodiments, tuples can be implemented in functional programing languages as a set of particular attributes (e.g., Sender, Receiver, Doc Type) with values that can be passed from one program to another, for instance, in a data flow such as document data flow 220. To this end, a tuple may also be referred to as a data flow tuple. Tuples may be defined for a client system, trading partner, Doc Type, direction, or solution ID. Each data flow is specific to how a managed service is to be performed for a particular client system (e.g., client system 119 of OU-A, a client of Trading Grid 100), for instance, sending a purchase order on behalf of Entity A to its trading partner, Entity N. In some embodiments, a tuple has globally unique attributes and is associated with an itinerary. In some embodiments, an itinerary can be an XML document that describes a processing model for processing a particular Doc Type. For example, processing a certain type of document may require performing a set of managed services on the document (e.g., translation services, format services, copy services, email services, document tracking services, messaging services, document transformation services, regulatory compliance services, encryption services, data manipulation services, or a combination thereof).

In some embodiments, every data flow has a Sender, a Receiver, and a Doc Type so that different processing models can be performed for different purposes even for relationships that exist between the same two partners. For example, enterprise A trades with TP B. Enterprise A has an address and TP B has an address. They may transact multiple document types as part of that relationship. Doc Types allows the Trading Grid to differentiate different processing needs in this relationship. For example, different managed services may be needed to process a purchase order and an advanced ship notice, but they may be exchanged between the same partners using the same addresses, and even in the same directions.

The workflow attributes (which are programmatically and automatically generated by the auto provisioning process described above, for instance, with references to FIGS. 2 and 3) are returned to the orchestration component (e.g., Orchestration Engine 160 shown in FIG. 1) that initiated this whole process. The orchestration component may operate to create a file set that basically has the new tuple for the newly provisioned TP (the receiver in this example). The tuple is passed to another service (e.g., multi-file processor 190 shown in FIG. 1) which takes the information contained in the tuple and determines what itinerary needs to be executed for that particular tuple. In some embodiments, the multi-file processor may reach out to CBR 158 to find what itinerary needs to be executed based on Sender, Receiver, and Doc Type.

In some embodiments, such a "file set" (which is automatically created by the orchestration component using the output from the auto-provisioning process) may represent an operational data model that can be used to describe files and their tuple associations. A file set can often be used in translation where a single input file may have 5, 10, or a thousand output files. It's an expandable model in which each file would have an individual Sender, Receiver, and Doc Type association. Following the example above in which a non-legal invoice was received from a client to the client's TP and triggers an auto-provisioning process to set up the client's TP in the Trading Grid, when the auto-provisioning process is complete, a file set is generated for the client's TP by the orchestration component. The multi-file processor gets the file set generated for the client's TP from the orchestration component with a sender address, a newly created receiver address, and a Doc Type and finds an itinerary (e.g., itinerary 165 shown in FIG. 1) that represents all the AIC activities needed to process the invoice. The multi-file processor sends the itinerary back to the orchestration component (e.g., Orchestration Engine 160) with the name of the itinerary for execution by the orchestration component (e.g., as part of receive process 205).

Figure 4:
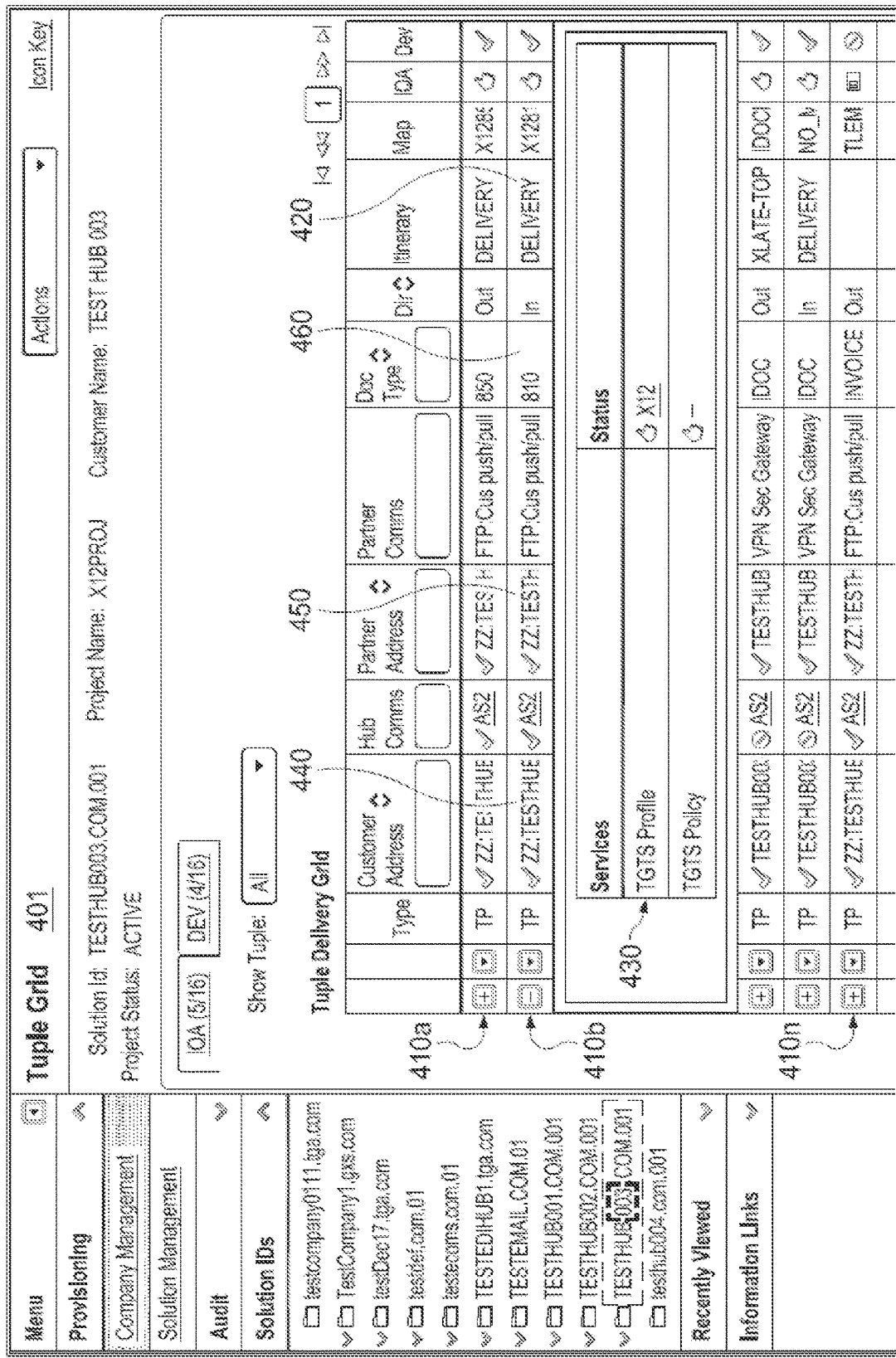
FIG. 4 depicts a diagrammatic representation of an example of a user interface for a custom solution according to some embodiments.

In some embodiments, an authorized user (e.g., a system administrator of the Trading Grid) can view details of the JIT auto-provisioning (e.g., operation 200) through a user interface. FIG. 4 depicts a diagrammatic representation of an example of a user interface for a custom solution according to some embodiments. While operation 200 is automated and can be transparent to Trading Grid clients and their TPs, in some embodiments, management UI 400 may be provided so that results of the JIT auto-provisioning (e.g., operation 200) may be visible internally within the Trading Grid.

In this example, management UI 400 may comprise Tuple Grid 401 for displaying solution-specific tuples 410*a* . . . 410*n*. Each managed service is defined in an itinerary for a tuple (which, as discussed above, was created using an output from the JIT auto-provisioning function and which includes a sender, a receiver, and a Doc Type) for completing a data flow within a custom solution. For instance, itinerary 420 specifies what services are to be used for processing tuple 410*b* of Doc Type 460 from a client system at customer address 440 to a trading partner's system at partner address 450. In the example of FIG. 4, a user interface element such as an icon with a plus "+" symbol may be associated with an expansion function in which, upon selection of the "+" symbol, Tuple Grid 401 can be expanded to display all of the services automatically associated with the particular tuple per the tuple's itinerary (e.g., the Trading Grid Translation Service or TGTS Profile service and the TGTS Policy service of services 430 specified in itinerary 420 for tuple 410*b*).

Figure 5:
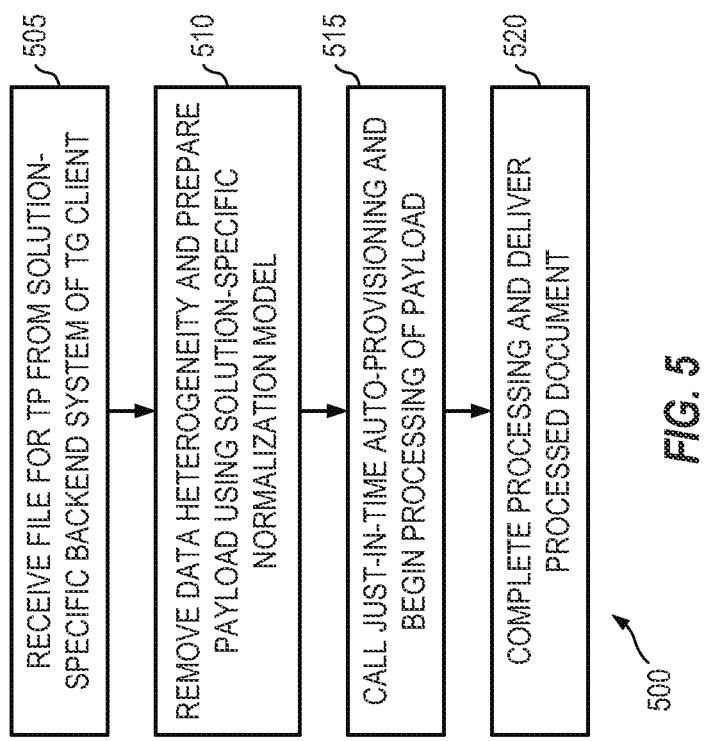
FIG. 5 depicts a flow chart illustrating an example of a method for just-in-time auto-provisioning according to some embodiments.

The JIT auto-provisioning solution described above can be implemented in many ways. For example, FIG. 5 depicts a flow chart illustrating an example of a method for JIT auto-provisioning according to some embodiments. Control logic implementing main process 500 may operate to receive a file for a TP of a Trading Grid client from a solution-specific backend system of the Trading Grid client (e.g., a client system) (505), remove data heterogeneity from the received file and prepare a normalized payload using a solution-specific normalization model as described above (510), and make a JIT auto-provisioning service call to a JIP provisioning subsystem (e.g., JIT provisioning module 167 of system 110 shown in FIG. 1) (515). The JIP provisioning subsystem may implement the auto-provisioning process described above and return a response (e.g., response 235). Main process 500 may utilize the response from the JIP provisioning subsystem to complete the processing (e.g., generating a file set, finding an itinerary, executing the itinerary, executing a data flow, etc.) and generate a deliverable (e.g., a processed document such as a signed legal invoice), and provide the deliverable to the TP (520).

Figure 6A:
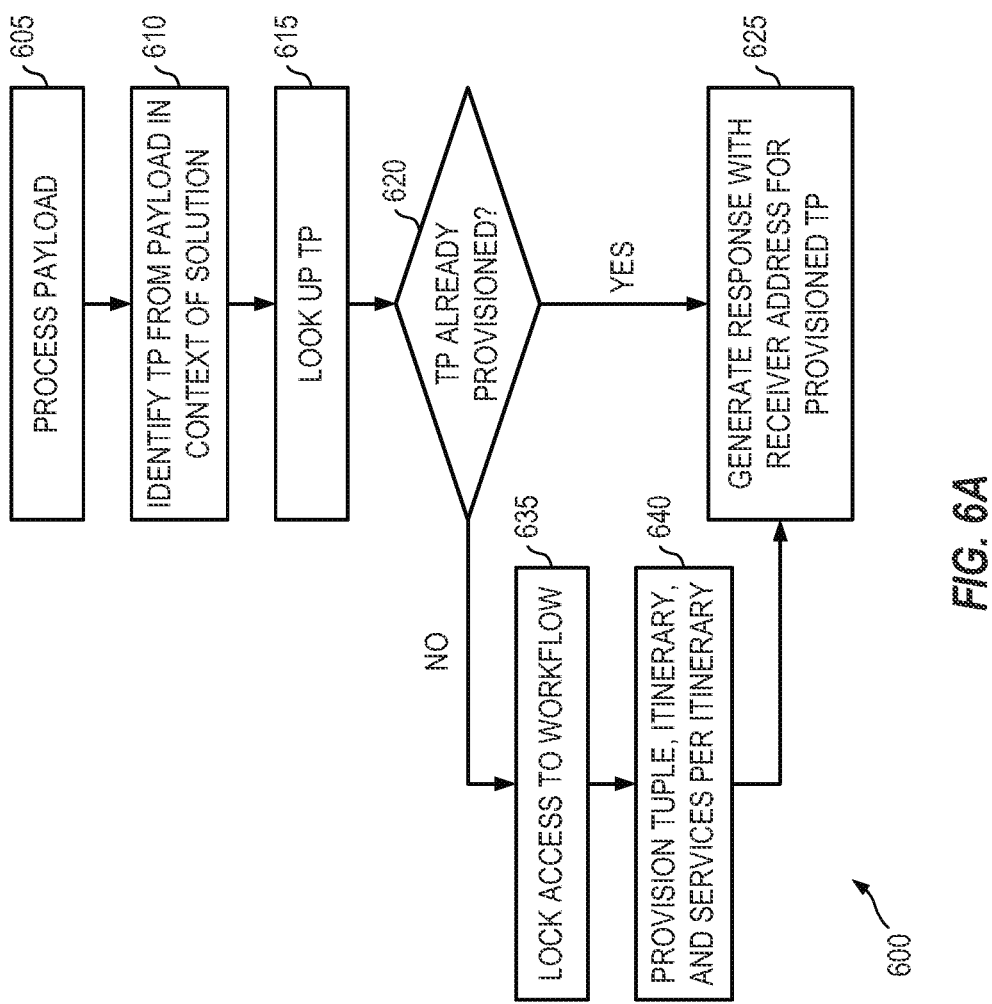
FIGS. 6A and 6B are flow charts illustrating example implementations of a just-in-time auto-provisioning method according to some embodiments.
Figure 6B:
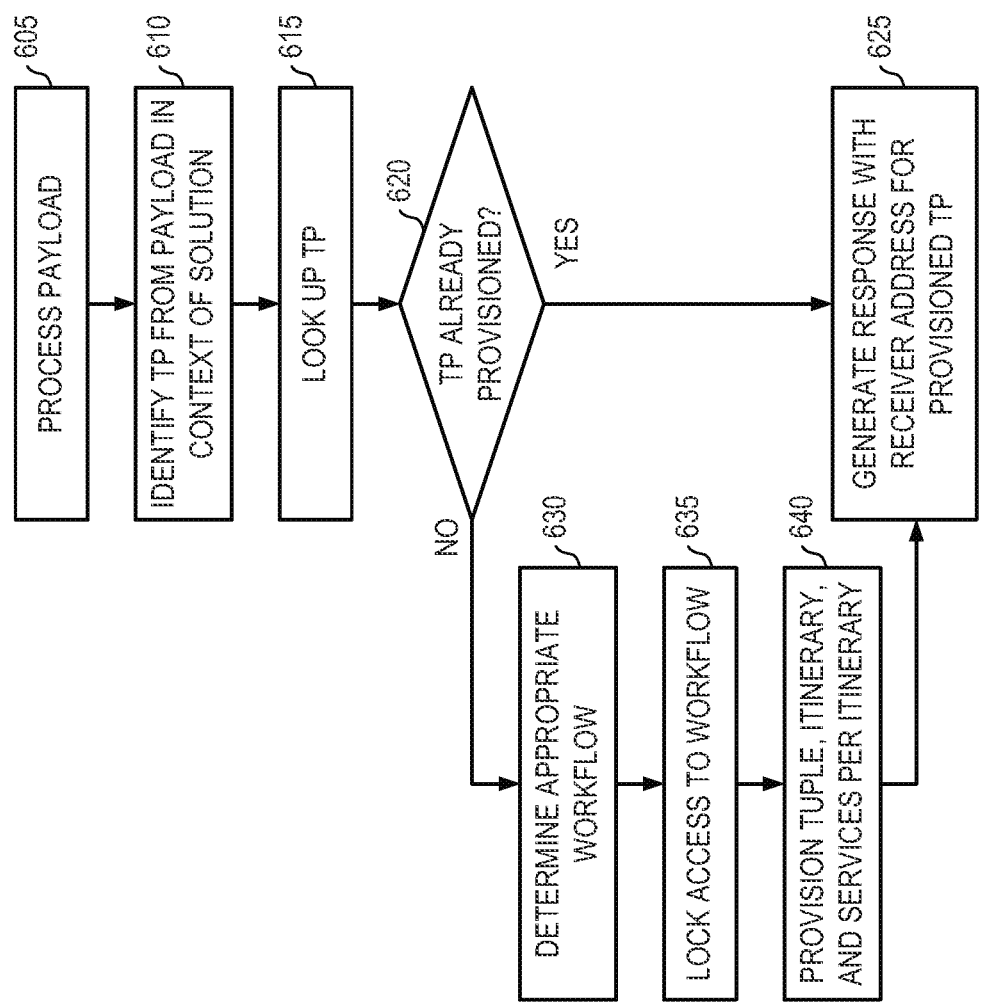

In some embodiments, the JIP provisioning subsystem of the Trading Grid may implement the auto-provisioning process described above in many ways. FIGS. 6A and 6B are flow charts illustrating example implementations according to some embodiments. In the example of FIG. 6A, a JIP provisioning subsystem may implement process 600 which begins with processing a payload (e.g., a normalized payload generated by normalize process 210 shown in FIG. 2) (605). Process 600 may include determining, from the payload, a unique reference that identifies a TP in the context of a custom solution specific to the client system (610). Process 600 is operable to search for the TP in a lookup table (615) and determine whether the TP had already been provisioned (620). If so, process 600 may proceed to generate a response (e.g., response 235 shown in FIG. 2) (625). The response generated by process 600 may include a receiver address of the provisioned TP. If the TP has not been provisioned, process 600 may proceed to lock access to a JIT auto-provisioning workflow (635) and provision the TP, including generating a legal entity representing the TP and generating a tuple per an itinerary for all managed services included in the itinerary (640). Once the TP is provisioned, process 600 may then generate a response (e.g., response 235 shown in FIG. 2) (625). As discussed above, the response is returned to the main process that called the JIT provisioning subsystem to perform process 600.

In the implementation example of FIG. 6B, process 600*a* can be similar to process 600 in the implementation example of FIG. 6A, but with an additional step to call a workflow engine to select a workflow before locking access to a JIT auto-provisioning workflow (635). Such a workflow engine may have access to different workflow definitions for various JIT auto-provisioning workflows.

Skilled artisans appreciate that different JIT auto-provisioning workflows may be utilized to provision different solution stacks, an example of which is shown in FIG. 3. A solution stack refers to a group of programs, utilizes, routines, etc. that work in tandem to produce a result or achieve a common goal for a specific custom solution. These solution stacks may be functionally equivalent, but with different names. For example, a solution stack may require a Trading Partner Relationship (TPR) service be created in TGMS. The TPR service is configured for informing the routing engine that it has permission to route from a Sender to a Receiver. Likewise, profile information may need to be created in the Application Integration (AI) service for the TP in DOTS, which is the analog of community master data (CMD), and a set of activities related to CMD in the AIC service. The AI service may be called the Trading Grid Translation Service (TGTS) in another solution stack. However, both the AI service and the TGTS can operate in a functionally equivalent manner as each functions as a translator so that when it sees a document going to a particular TP, it can create a data format that is necessary for PDF creation as a deliverable to the TP, for instance.

In some embodiments, solution stacks may include CPS interfaces to access a workflow engine that implements, for instance, a JIT auto-provisioning workflow described herein. The workflow engine may include workflow definitions associated with different JIT auto-provisioning workflows. In the example of FIG. 6B, at 630, the workflow engine may determine an appropriate workflow definition and execute a JIT auto-provisioning workflow associated with the workflow definition. In some embodiments, workflow definitions can be implemented as XML files. An administrator could model a new workflow, test it, make sure all the interactions with all the services work fine, everything defined works, and then register it with the workflow engine. The workflow definition may specify what to be executed when something of a particular type comes in to the Trading Grid.

The JIT auto-provisioning solution described above can be adapted for different purposes, for example, modification scenarios where Trading Grid clients can provide the Trading Grid with updates to certain information attributes and JIT auto-provisioning can be leveraged to modify them. This can be an automated process in which specific attribute values are received from Trading Grid clients denoting "this is an update." A JIT auto-provisioning workflow can be invoked to override any information received in the past with the new information. In this use case, a TP is not provisioned again. Rather, it is the information about them that is automatically updated.

Such modifications can again go through the orchestration component because, in the above use case, the end result is to sign that invoice. For example, suppose the point of contact email address is changed. This change needs to be updated so that the signed invoice is not sent to the now outdated wrong email address. Thus, when a new email address comes in, the orchestration component would need to go through the process and inform the delivery service that this is the new email address for that TP. The invoice still comes in and triggers the process, but the process performs an update just-in-time modification to an already provisioned TP.

In some embodiments, the same locking mechanism described above can take over and lock the JIT modification so that other document(s) targeted to that TP are not delivered asynchronously to the wrong email address before the update is made. The locking mechanism does not know what needs to be updated—might be the delivery destination or something else, it just knows that an update needs to occur and locks access to the TP. When the updating is done, the locking mechanism releases the lock so the next file can come through and get processed and eventually delivered to the right address. Most of the JIT modification infrastructure can be the same or similar to the JIT auto-provisioning infrastructure described above, whether it is an update workflow or an initial JIT auto-provisioning workflow. Other implementations may also be possible.

Figure 7:
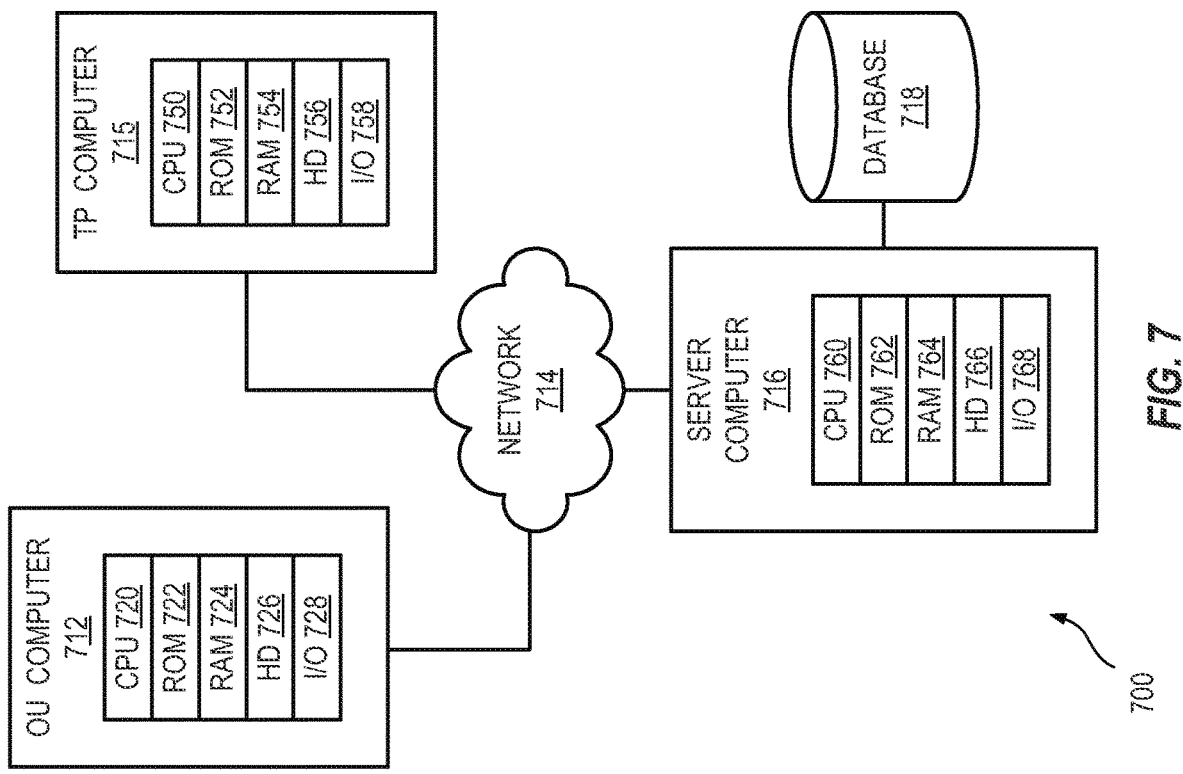
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to first enterprise computer 712, second enterprise computer 715, and Trading Grid computer 716. Trading Grid computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of first enterprise computer 712, second enterprise computer 715, and Trading Grid computer 716. However, with each of first enterprise computer 712, second enterprise computer 715, and Trading Grid computer 716, a plurality of computers (not shown) may be interconnected to each other over network 714. For example, a plurality of first enterprise computers 712 and a plurality of second enterprise computers 715 may be coupled to network 714. First enterprise computers 712 may include data processing systems for communicating with Trading Grid computer 716. Second enterprise computers 715 may include data processing systems for individuals whose jobs may require them to configure services used by first enterprise computers 712 in network computing environment 700.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. First enterprise computer 712 can include a desktop computer, a laptop computer, a personal digital assistant, a cellular phone, or nearly any device capable of communicating over a network. Second enterprise computer 715 may be similar to first enterprise computer 712 and can comprise CPU 750, ROM 752, RAM 754, HD 756, and I/O 758.

Likewise, Trading Grid computer 716 may include CPU 760, ROM 762, RAM 764, HD 766, and I/O 768. Trading Grid computer 716 may include one or more backend systems configured for providing a variety of services to first enterprise computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A just-in-time (JIT) provisioning system, comprising:
a processor;
a non-transitory computer-readable medium; and
instructions stored on the non-transitory computer-readable medium and translatable by the processor for:
receiving, from a client system of an information exchange platform, a file;
processing the received file to generate a payload having a unique reference identifying a trading partner of the client system;
determining that the identified trading partner has not been provisioned in the information exchange platform;
provisioning the identified trading partner, the provisioning comprising creating an entity having profile information associated with the identified trading partner and a routing address associated with the identified trading partner; and
sending, to an orchestration engine executing on a server machine operating on the information exchange platform, the entity and the routing address associated with the identified trading partner, wherein the orchestration engine generates, utilizing the entity and the routing address, a deliverable for the identified trading partner thus provisioned.

2. The JIT provisioning system of claim 1, wherein the unique reference comprises an email address of the identified trading partner.

3. The JIT provisioning system of claim 1, wherein the deliverable for the identified trading partner comprises an email.

4. The JIT provisioning system of claim 3, wherein the instructions are further translatable by the processor for:
adding an address of the client system to the email such that the email appears to come directly from the client system.

5. The JIT provisioning system of claim 1, wherein the provisioning further includes at least one of creating a receiver address for the identified trading partner, creating an internal representation for updating a trading partner graph for the client system, or creating party information representing profile information for the identified trading partner.

6. The JIT provisioning system of claim 1, wherein the entity comprises a data object configured for holding a plurality of attributes necessary for processing the file from the client system for delivery to the identified trading partner thus provisioned.

7. The JIT provisioning system of claim 1, wherein the instructions are further translatable by the processor for:
making an application programming interface call to a messaging infrastructure of the information exchange platform to request a receiver address for the identified trading partner thus provisioned.

8. A method for just-in-time (JIT) provisioning, the method comprising:
receiving, from a client system of an information exchange platform, a file;
processing, by a JIT provisioning subsystem of the information exchange platform, the received file to generate a payload having a unique reference identifying a trading partner of the client system;
determining, by the JIT provisioning subsystem, that the identified trading partner has not been provisioned in the information exchange platform;
provisioning, by the JIT provisioning subsystem, the identified trading partner, the provisioning comprising creating an entity having profile information associated with the identified trading partner and a routing address associated with the identified trading partner; and
sending, by the JIT provisioning subsystem to an orchestration engine executing on a server machine operating on the information exchange platform, the entity and the routing address associated with the identified trading partner, wherein the orchestration engine generates, utilizing the entity and the routing address, a deliverable for the identified trading partner thus provisioned.

9. The method according to claim 8, wherein the unique reference comprises an email address of the identified trading partner.

10. The method according to claim 8, wherein the deliverable for the identified trading partner comprises an email.

11. The method according to claim 10, further comprising:
adding an address of the client system to the email such that the email appears to come directly from the client system.

12. The method according to claim 8, wherein the provisioning further includes at least one of creating a receiver address for the identified trading partner, creating an internal representation for updating a trading partner graph for the client system, or creating party information representing profile information for the identified trading partner.

13. The method according to claim 8, wherein the entity comprises a data object configured for holding a plurality of attributes necessary for processing the file from the client system for delivery to the identified trading partner thus provisioned.

14. The method according to claim 8, further comprising:
    making an application programming interface call to a messaging infrastructure of the information exchange platform to request a receiver address for the identified trading partner thus provisioned.

15. A computer program product for just-in-time (JIT) provisioning, the computer program product comprising a non-transitory computer-readable medium storing instructions translatable by a processor for:
    receiving, from a client system of an information exchange platform, a file;
    processing the received file to generate a payload having a unique reference identifying a trading partner of the client system;
    determining that the identified trading partner has not been provisioned in the information exchange platform;
    provisioning the identified trading partner, the provisioning comprising creating an entity having profile information associated with the identified trading partner and a routing address associated with the identified trading partner; and
    sending, to an orchestration engine executing on a server machine operating on the information exchange platform, the entity and the routing address associated with the identified trading partner, wherein the orchestration engine generates, utilizing the entity and the routing address, a deliverable for the identified trading partner thus provisioned.

16. The computer program product of claim 15, wherein the unique reference comprises an email address of the identified trading partner.

17. The computer program product of claim 15, wherein the deliverable for the identified trading partner comprises an email.

18. The computer program product of claim 17, wherein the instructions are further translatable by the processor for:
    adding an address of the client system to the email such that the email appears to come directly from the client system.

19. The computer program product of claim 15, wherein the provisioning further includes at least one of creating a receiver address for the identified trading partner, creating an internal representation for updating a trading partner graph for the client system, or creating party information representing profile information for the identified trading partner.

20. The computer program product of claim 15, wherein the entity comprises a data object configured for holding a plurality of attributes necessary for processing the file from the client system for delivery to the identified trading partner thus provisioned.

* * * * *